May 20, 1924.

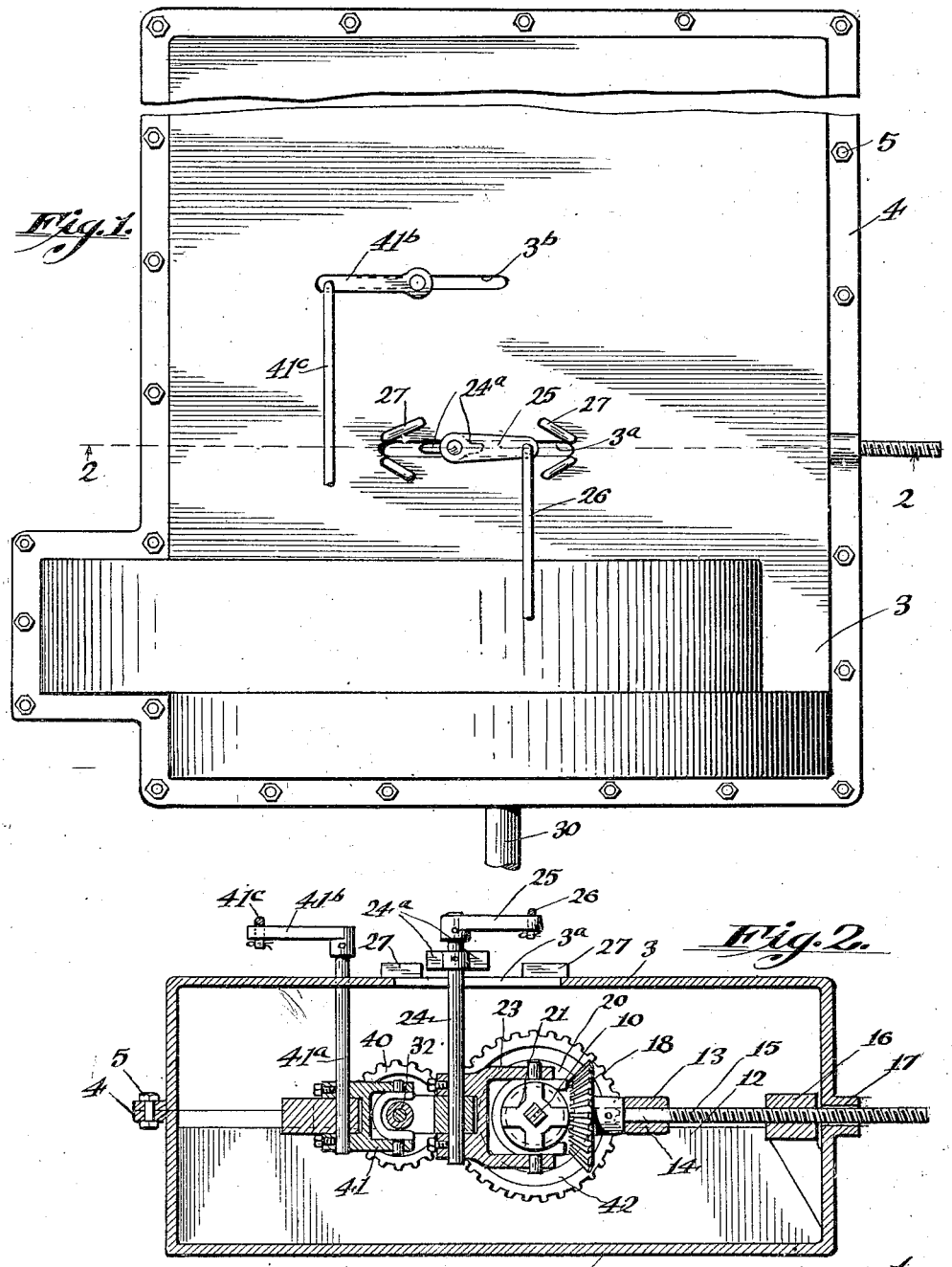

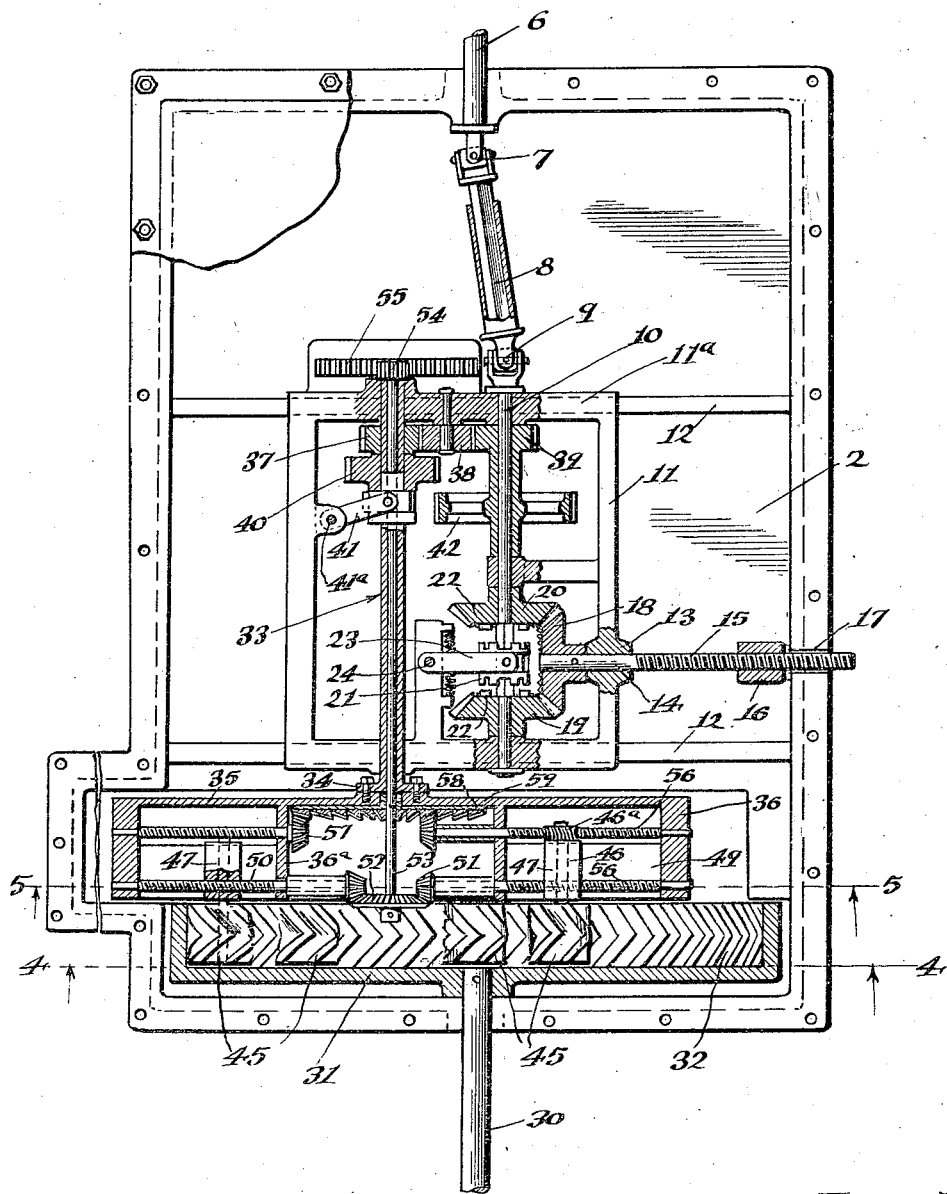

E. L. WEISS 1,494,726

VARIOUS SPEED TRANSMISSION

Filed May 24, 1923      3 Sheets-Sheet 3

Inventor:
ERNEST L. WEISS
By Hazard and Miller
Attorneys

Patented May 20, 1924.

1,494,726

UNITED STATES PATENT OFFICE.

ERNEST L. WEISS, OF PASADENA, CALIFORNIA.

VARIOUS-SPEED TRANSMISSION.

Application filed May 24, 1923. Serial No. 641,081.

*To all whom it may concern:*

Be it known that I, ERNEST L. WEISS, a citizen of Switzerland, residing at Pasadena, in the county of Los Angeles and State of California, have invented new and useful Improvements in Various-Speed Transmissions, of which the following is a specification.

This invention relates to mechanical movements, and more particularly to variable speed and reverse transmission mechanisms.

It is an object of the present invention to provide a positive gear power-transmitting mechanism including what might be termed a variable or expansible and contractable driving gear forming a pinion cooperative with a wheel to be driven thereby. Another object of the present invention is to provide a variable speed transmission mechanism whereby a change of speed may be accomplished by a positive gear train without requiring a relative shifting of the driving and the driven gears, and therefore, an object is to avoid the meshing and unmeshing of gears incident to the change of speed.

Another object of the invention is to provide a variable speed and reverse mechanism including an expansible and contractable driving pinion and means, power driven and manually controlled, for effecting the increase or decrease in the effective pitch diameter of the variable pinion. An object is to provide a mechanism including a non-shiftable driven gear and a relatively variable driving pinion, including driving dogs or teeth radially movable as to their common center to effect a change in pitch diameter, and in this connection, an object is to provide a power-driven, manually controlled means for effecting a lateral shifting in two directions of the driving pinion.

Other objects and advantages will be made manifest in the following specification of an embodiment of the invention illustrated in the accompanying drawings, wherein Figure 1 is a plan of the box of the transmission, longitudinally broken away.

Fig. 2 is a transverse section on the plane indicated by line 2—2 of Figure 1.

Fig. 3 is a plan and horizontal section of the apparatus; the top of the gear box being removed.

Figure 4:
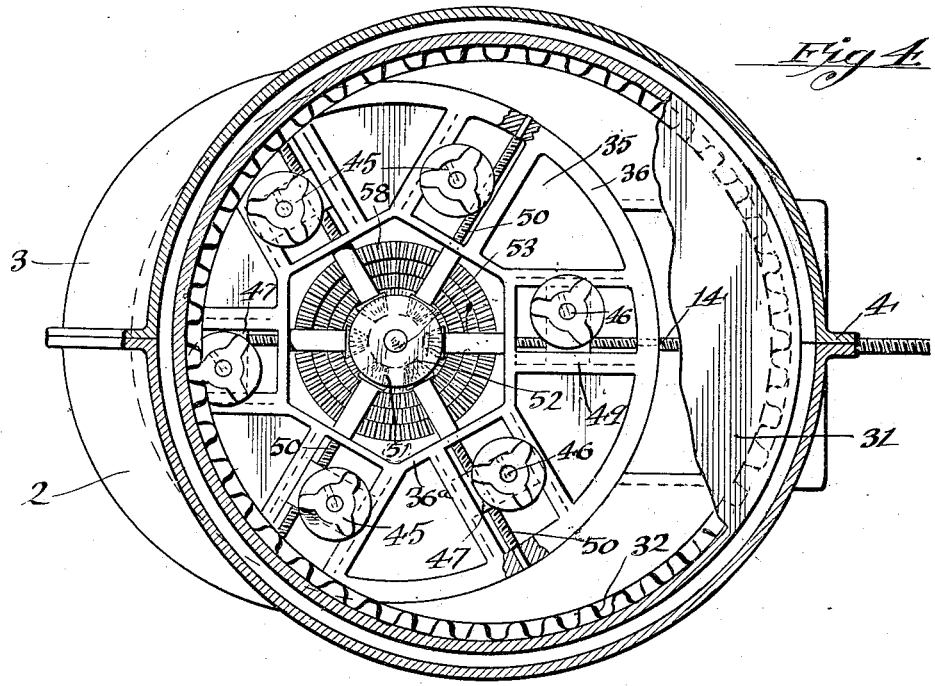
Fig. 4 is a transverse section on the plane indicated by line 4—4 of Figure 3.
Figure 5:
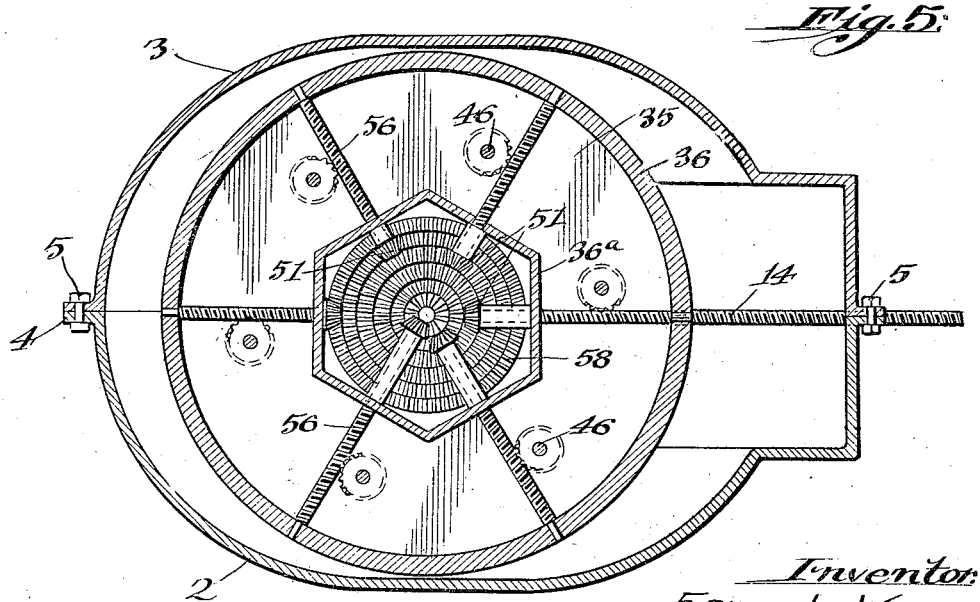
Fig. 5 is a transverse section on the plane indicated by line 5—5 of Figure 3.

A machine of the present invention consists of a positive gear train which, preferably, is arranged within a shell, case or gear box that may comprise opposed sections 2 and 3, each provided with circumferential flanges 4, having meeting faces to be clamped and secured together as by screws or bolts 5. This gear box is, as clearly shown, given a form and dimensions as determined by the general arrangement, form and size of the enclosed gears and parts associated therewith.

It is to be understood that power may be transmitted to and taken from either end of the transmitting apparatus, and for the purposes of description power may be considered as transmitted to the machine as by a shaft 6, extending axially from one end of the box and being universally jointed at 7 to a telescopic shaft 8, which in turn is universally jointed at 9 to a main shaft 10. This shaft is journaled in a carriage or frame including side bars 11 and end bars 11ª in the present case, forming a substantially rectangular slide which is laterally shiftable in the gear box 2 on rails 12 extending transversely in the gear box.

The carriage 12 is, in the accomplishment of the objects of the mechanism, adapted to be shifted by power derived from the main shaft 10 and under manual control, and for this purpose there is journaled at 13 in the carriage a transversely extending spindle 14, having a threaded portion 15 engaging a fixed nut 16, which may be attached to or provided on one side of the gear box 2, and which side is provided with an aperture 17 through which the screw portion 15 may pass freely in its axial movement. On the inner end of the spindle 14 there is secured a bevel gear 18, opposite sides of which are respectively engaged by gears 19 and 20, which are loose on the main shaft 10, which is constantly driven in one direction when the shaft 6 is in operation. Disposed between the loose gears 19 and 20 is an axially shiftable clutch 21 having end faces adapted to positively engage clutch faces 22 provided on the adjacent faces of the gears 19 and 20; the clutch member 21 being splined or otherwise non-rotatively but slidably mounted on the main shaft so as to be constantly driven therewith.

When it is desired to shift the carriage 11 in either direction transversely in the gear box, the clutch member 21 is thrown as by a clutch lever 23, secured on a perpendicularly extending rock shaft 24, projecting through the upper section 3 of the gear box, which is slotted at 3ª to receive the rock shaft 24. The upper end of the rock shaft projecting above the gear box section 3 is provided with a lever arm 25, which may be oscillated by any suitable means, as for instance a link 26, which may extend to the driver's or operator's seat or station, or be otherwise suitably disposed of. Thus it will be seen that when the clutch lever 23 is operated, the clutch 21 will be thrown into mesh with either of the gears 19 or 20 and this will result in rotation of the screw 15 and the carriage will be shifted in one direction or the other, as desired.

Since the rock shaft 24 will shift with the carriage 11, it will move in the box slot 3ª, and means are provided for automatically tripping the lever 25 and the clutch shifting lever 23 as the rock shaft approaches the ends of the slot so as to insure positive disconnection of the clutch member 21 from an engaged gear. For this purpose the rock shaft 24 is provided with oppositely extending lugs 24ª, and these are designed to encounter inclined cam-forming lugs 27 which are provided on the top of the gear box section 3; so that irrespective of which way the rock shaft 24 may have been turned, one of the lugs 24ª will encounter one of the inclined cams or shoulders 27 and, this being properly disposed, will deflect the engaged lug 24ª of the rock shaft to the neutral position of the rock shaft and its lever 23 and will, therefore, disconnect the clutch member 21 and prevent further shifting of the carriage as it approaches the limits of its movement.

Mounted in the opposite end of the gear box from the driving shaft 6 is a driven shaft 30, and this is provided within the gear box with a driven gear wheel 31 which, in the present case, is shown as of the internal gear form and, while not necessarily so, is preferably provided with gear teeth 32 of the herring-bone style. Means are provided and mounted upon the carriage 11 for driving the gear 31, and this means includes a device which may be considered and termed a variable toothed pinion in that it includes a rotative device in the form of a frame or wheel driven by the main shaft 10 and having driving dogs or elements arranged in a symmetrical order about the axis of rotation of the carrying frame or wheel, and which elements are adapted to be automatically and mechanically shifted radially so as to effect an increase or decrease in their pitch circles, and in each of which the said elements are severally designed to mesh positively with the internal teeth of the gear 31.

A form of such driving mechanism carried by the carriage 11 includes a tubular shaft 33 journaled on the carriage in parallel position to the main shaft 10 thereon, and to one end of the hollow shaft 33 is attached, by a flange 34, a rotary member which may be in the form of a frame or a disc 35, here shown as provided with a peripheral flange 36, and which wheel flange 36 has its edge disposed relatively close to the contiguous edge of the internal gear 31, for conservation of space and compactness of elements. The hollow shaft 33 is provided with a shiftable gear 37, meshing with an intermediate gear 38 journaled on a support provided by the carriage 11 and meshing with a driving gear 39, fixed on the main shaft 10. This provides for the positive rotation of the hollow shaft 33 by the main shaft in one direction.

To drive the counter or hollow shaft 33 in the opposite direction, there is splined on the hollow shaft a gear 40, adapted to be shifted, by a shift lever 41, into mesh with a gear 42 which is fixedly provided on the main shaft 10 so that, when the gear 40 is shifted into mesh with the gear 42, the shaft 33 will be rotated in a direction reverse to the direction of rotation caused by the intermediate gear 38; the gear 37 also being splined on the shaft 33 so as to be disengaged when the gear 42 is engaged.

The gear shift lever 41 is secured on a rock shaft 41ª which extends up through, and moves laterally in, a slot 3ᵇ provided in the shell section 3. The upper end of the rock shaft 41ª is provided with a lever arm 41ᵇ, and this is adapted to be oscillated to effect a shifting of the gears 37—40 as by means of a connection 41ᶜ, which may be extended to any convenient operating position.

From the above it will be seen that means are provided for laterally shifting the carriage 11 and for continually driving the main shaft, irrespective of its position between limits, and further, for driving the tubular, counter shaft 33, which, with its wheel 35, is shifted with and by the carriage 11 as to the non-shiftable driven gear wheel 31.

To transfer power from the driving wheel 35 to the gear 31, the wheel is provided with relatively radially shiftable devices, one or more of which is designed to be constantly in mesh with the internal gear 31. Such devices, therefore, serve the purpose of and act as driving dogs engaging the gear 31. Preferably, these driving dogs are in the form of cylindrical pinions 45, a suitable number of which is provided, and these pinions have a tooth form corresponding to the teeth 32 of of the gear 31, so as to properly mesh therewith as the driving pinions 45, rotating in an orbit about the axis of the shaft 33, successively move into driving engagement with the gear 31.

The pinions are disposed with axes parallel to the counter shaft 33 and are also disposed beyond the plane of the edge of the flange 36 so that they will project within the flange of the internal gear 31 and engage the teeth thereof.

In the present arrangement, each pinion 45 is secured on a shaft 46, which is rotatively journaled in a respective sliding block 47, and these blocks are substantially radially movable in pairs of guides 48—49 provided in the driving wheel 35. Means are provided for mechanically shifting the pinion blocks 47 outwardly or inwardly concurrently by power from the main shaft 10, and such means include a set of radially disposed screws 50 engaging threaded apertures provided therefor in the shifting blocks 47, the screws being journaled in the flange 36 of the wheel and in an inner web 36ᵃ.

The screws 50 have provided at their inner ends bevel pinions 51, and these are constantly in mesh with the driving gear 52, which is secured on a spindle 53 extending axially through the tubular shaft 33 and having on its opposite end a spur gear pinion 54. This pinion is in constant mesh with the fixed rack 55. The function of this instrumentality is to effect a rotation of the radial screws 50 and a shifting of the pinions 45 and their bearing blocks 47 concurrently with a shifting of the carriage 11 in either direction.

Obviously, as the carriage is moved in one direction, the spur pinion or gear 54 will be rotated by the fixed rack 55, and this will result in the rotation of the sun gear 52 and the several engaging pinions 51 of the screws 50. Rotation of the screws in one direction, as when the carriage 11 is shifted away from the axial line of the gear 31, will result in the relative contraction of the set of pinions 45 and, as the diameter of the circle in which the set of gears is disposed decreases, the driving ratio between the set of pinions 45 and the gear 31 concurrently decreases. Conversely, as the carriage 11 is shifted with the movement of the driving wheel 35 toward the axis of the gear wheel 31, the circle of the set of pinions 45 will be relatively increased in diameter and there will be an increase of speed of the driving gear 31 corresponding to the relative increase in the diameter of the circle of the driving pinions or dogs 45.

Since the driving pinions or dogs 45 are normally fixed as to their carrying wheel or frame 35, and since this is rotatively driven primarily from the main shaft 10, it will be seen that the devices 45, therefore, form each fixed gear teeth successively sweeping into mesh with the gear teeth 32 of the gear 31, and then passing from mesh due to the eccentricity of the wheel 35 as to the axis of the gear 31.

Since the driving pinions or dogs 45 are radially adjustable with respect to the axis of their circle, which is also the axis of the wheel 35, it is clear that, as the circle of the set of pinions increases, coincident with the shifting of the carriage 11, the pinions will be relatively separated by arcs of greater length, and, conversely, as the circle of the set of pinions is decreased, the pinions move relatively toward each other and are spaced by arcs of lesser length.

It is desirable to provide means for causing the teeth of the driving pinions 45 to be properly presented as the pinions successively roll into mesh with the teeth of the gear 31, and therefore means are provided for relatively rotating the several pinions 45 concurrently with the shifting of the carriage 11 so as to present the teeth in proper position to easily mesh with the internal gear 31.

To that end, the pinion spindles 46 are each provided with a small worm pinion 46ᵃ and these are constantly engaged by radially disposed screws 56, mounted in the wheel 35 and each carrying on its inner end a bevel pinion 57. The several pinions 57 constantly mesh with concentric bevel gears 58, provided on a disc 59 contiguous to the hub of the wheel 35 and fixed on the central shaft 53 so that, when this shaft rotates it turns not only the pinions 51 of the screws 50, of the blocks 47, but also turns the disc 59 with its bevel gears 58. The result of this is that the set of screws 56 is rotated and the pinions 45 are slowly rotated about their own axes while turning in their orbit about the axis of the shaft 53 and wheel 35. This rotation of the driving pinions 45, therefore, causes these pinions to roll properly into mesh with the teeth 32 of the gear 31. It is understood that there is a rotation of the pinions 45 on their own axes only concurrently with the shifting of the carriage 11 to effect an increase or a decrease in the circle and, incidentally, in the orbit in which the pinions 45 swing.

From the above it will be seen that I have provided a variable speed transmission mechanism, including a driving wheel or driving structure having a set of driving dogs or pinions arranged in circular disposition, and have provided means for increasing or decreasing the circle and orbit in which the pinions move, and at the same time provided for the constant mesh of one or more of the pinions with the driven gear wheel of the transmission.

Further objects, modifications and variations may be resorted to within the principle of the invention.

What is claimed is:

1. A variable speed mechanism, including relatively eccentrically shiftable driving and driven rotative elements, one of which is provided with a set of circularly disposed effective transmitting devices adapted to engage the other element, and said devices being radially shiftable with respect to the axis of their orbit so as to provide a substantially circumferentially variable, power-transmitting connection between the two elements.

2. A variable speed mechanism, including relatively eccentrically shiftable driving and driven rotative elements, set with end faces in close juxtaposition, and one of which is provided with a set of circularly disposed effective transmitting devices adapted to engage the other element, and said devices being radially shiftable with respect to the axis of their orbit so as to provide a substantially circumferentially variable, power-transmitting connection between the two elements.

3. A variable speed mechanism, including relatively eccentrically shiftable driving and driven rotative elements, one of which is provided with a set of circularly disposed effective transmitting devices adapted to engage the other element, and said devices being radially shiftable with respect to the axis of their orbit so as to provide a substantially circumferentially variable, power-transmitting connection between the two elements, the driven element having internal gear teeth and said devices being provided with gear teeth to mesh with the teeth of the cooperative toothed element.

4. A variable speed mechanism, including relatively eccentrically shiftable driving and driven rotative elements, one of which is provided with a set of circularly disposed effective transmitting devices adapted to engage the other element, and said devices being radially shiftable with respect to the axis of their orbit so as to provide a substantially circumferentially variable, power-transmitting connection between the two elements, the driven element consisting of an internal gear and said devices consisting of gear pinions adapted to successively roll into intermesh with the internal gear teeth.

5. A variable speed mechanism, including relatively eccentrically shiftable driving and driven rotative elements, one of which is provided with a set of circularly disposed effective transmitting devices adapted to engage the other element, and said devices being radially shiftable with respect to the axis of their orbit so as to provide a substantially circumferentially variable, power-transmitting connection between the two elements, and means for shifting the element carrying said devices and concurrently, radially shifting said devices as to the center of their orbit.

6. A variable speed mechanism, including relatively eccentrically shiftable driving and driven rotative elements, one of which is provided with a set of circularly disposed effective transmitting devices adapted to engage the other element, and said devices being radially shiftable with respect to the axis of their orbit so as to provide a substantially circumferentially variable, power-transmitting connection between the two elements, said devices being rotatively mounted on their carrying element.

7. A variable speed mechanism, including relatively eccentrically shiftable driving and driven rotative elements, one of which is provided with a set of circularly disposed effective transmitting devices adapted to engage the other element, and said devices being radially shiftable with respect to the axis of their orbit so as to provide a substantially circumferentially variable, power-transmitting connection between the two elements, said devices being rotatively mounted on their carrying element, and means for shifting the carrying element and concurrent with the shifting action rotating said devices on their own axes to cause them to have a rolling, meshing action with the coordinate element.

8. A variable speed mechanism, including relatively eccentrically shiftable driving and driven rotative elements, one of which is provided with a set of circularly disposed effective transmitting devices adapted to engage the other element, and said devices being radially shiftable with respect to the axis of their orbit so as to provide a substantially circumferentially variable, power-transmitting connection between the two elements, means for shifting the element carrying the said devices laterally as to the axis of the other element, and means for concurrently shifting the said devices when their carrying element is laterally shifted, whereby to increase the circle of their orbit or to decrease the circle of their orbit.

9. A variable speed mechanism, including relatively eccentrically shiftable driving and driven rotative elements, one of which is provided with a set of circularly disposed effective transmitting devices adapted to engage the other element, and said devices being radially shiftable with respect to the axis of their orbit so as to provide a substantially circumferentially variable, power-transmitting connection between the two elements, and means for rotating the device-carrying element in either of two directions.

10. A variable speed, power-transmitting and reversing mechanism, including relatively eccentrically shiftable driving and driven rotative elements, one of which is provided with a set of circularly disposed effective transmitting pinions adapted to engage the other element, and said pinions being radially shiftable with respect to the axis of their orbit so as to provide a substantially circumferentially variable, power-transmitting connection between the two elements, and means for driving the pinion-carrying element in either of two directions.

11. A variable speed mechanism, including relatively eccentrically shiftable driving and driven rotative elements, one of which is provided with a set of circularly disposed effective transmitting devices adapted to engage the other element, and said devices being radially shiftable with respect to the axis of their orbit so as to provide a substantially circumferentially variable, power-transmitting connection between the two elements, and power-driven means for shifting the element carrying said devices and concurrently, radially shifting said devices as to the center of their orbit.

12. A variable speed mechanism, including relatively eccentrically shiftable driving and driven rotative elements, one of which is provided with a set of circularly disposed effective transmitting devices adapted to engage the other element, and said devices being radially shiftable with respect to the axis of their orbit so as to provide a substantially circumferentially variable, power-transmitting connection between the two elements, and power-driven, manually controlled means for shifting the element carrying said devices and concurrently, radially shifting said devices as to the center of their orbit.

13. A variable speed, power-transmitting mechanism, including a rotary element to be driven, a driving, rotary element having a plurality of effective driving devices adapted to engage the driven element, and means for radially shifting said devices inwardly or outwardly to vary circular orbits in which the devices are adapted to sweep when the driving element is rotated; the devices being arranged symmetrically as to the axis of the driving element.

14. A variable speed, power-transmitting mechanism, including a rotary element to be driven, a driving, rotary element having a plurality of effective driving devices adapted to engage the driven element, and means for radially shifting said devices inwardly or outwardly to vary circular orbits in which the devices are adapted to sweep when the driving element is rotated; the devices being arranged symmetrically as to the axis of the driving element, and said shifting means being operative to shift the said devices in symmetrical action, whereby to change the relative ratio of the orbit to the engaged part of the driven element.

15. A variable speed, power-transmitting mechanism, including a rotary element to be driven, a driving, rotary element having a plurality of effective driving devices adapted to engage the driven element, and means for radially shifting said devices inwardly or outwardly to vary circular orbits in which the devices are adapted to sweep when the driving element is rotated; the devices being arranged symmetrically as to the axis of the driving element, and said shifting means being operative to shift the said devices in symmetrical action, whereby to change the relative ratio of the orbit to the engaged part of the driven element, said devices being normally fixed to their carrying element.

16. A variable speed, power-transmitting mechanism, including a rotary element to be driven, a driving, rotary element having a plurality of effective driving devices adapted to engage the driven element, means for radially shifting said devices inwardly or outwardly to vary circular orbits in which the devices are adapted to sweep when the driving element is rotated; the devices being arranged symmetrically as to the axis of the driving element, and said shifting means being operative to shift the said devices in symmetrical action, whereby to change the relative ratio of the orbit to the engaged part of the driven element, said devices being normally fixed to their carrying element, and means for relatively rotating the said devices as to their carrying element while the orbit of the devices is being changed.

17. In a variable speed, transmission mechanism, a rotative element, and a set of circularly arranged pinions adapted to be driven in a circular orbit while operatively engaging the said rotative element, said devices being adjustable to vary their orbit.

18. In a variable speed, transmission mechanism, a rotative element, a set of circularly arranged pinions adapted to be driven in a circular orbit while operatively engaging the said rotative element, and means for increasing or decreasing the orbit of the said pinions so as to effect a change of speed between the set of pinions and the rotative element engaged by the pinions.

19. In a variable speed, transmission mechanism, a rotative element, a set of circularly arranged devices adapted to be driven in a circultr orbit while operatively engaging the said rotative element, means for increasing or decreasing the orbit of the said devices so as to effect a change of speed between the set of devices and the rotative element engaged by the devices, and a rotative element carrying the said devices and whose axis of rotation is the axis of the variable orbit of said devices.

20. In a variable speed, transmission mechanism, a rotative element, a set of circularly arranged pinion gears adapted to be driven in a circular orbit while operatively engaging the said rotative element, and means for driving the set of gears in either direction around their orbit.

21. In a variable speed, transmission mechanism, a rotative element, and a set of circularly arranged gears adapted to be driven in a circular orbit while operatively engaging the said rotative element, said rotative element including a wheel having a circular, interior toothed face which is cooperative with the said gears as they successively sweep into effective, contacting position therewith.

22. In a variable speed, transmission mechanism, a rotative, internal gear element, and a set of circularly arranged relatively shiftable gears adapted to be driven in a circular orbit while operatively engaging the said rotative gear element.

23. In a variable speed, power transmitting mechanism, a rotary element, and a set of circularly arranged pinions which are radially adjustable relative to the center of their circle and which operatively engage an internal face of the said element, the said pinions being combined to rotate as a unit about the center of the circle.

24. In a power transmitting mechanism, combined, mutually engaging, rotative instrumentalities, one of the instrumentalities including devices in circular arrangement and which are radially adjustable as to the center of such arrangement, whereby to increase or decrease the length of the orbit of the devices when their carrying instrumentality is rotated.

In testimony whereof I have signed my name to this specification.

ERNEST L. WEISS.